(12) United States Patent
Pinsenschaum et al.

(10) Patent No.: US 6,592,146 B2
(45) Date of Patent: Jul. 15, 2003

(54) VARIABLE PROFILE AIR BAG RESTRAINT

(75) Inventors: Ryan Todd Pinsenschaum, Vandalla, OH (US); Laura Adelle Hawthorn, Tipp City, OH (US); Stephanie L Dunkle, Springboro, OH (US); Mark Thomas Winters, Troy, OH (US); Shawn Gregory Ryan, Dayton, OH (US); Gary R Greib, Lake Orion, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/101,251

(22) Filed: Mar. 19, 2002

(65) Prior Publication Data

US 2002/0096871 A1 Jul. 25, 2002

Related U.S. Application Data

(62) Division of application No. 09/672,474, filed on Sep. 28, 2000.
(60) Provisional application No. 60/165,330, filed on Nov. 12, 1999, and provisional application No. 60/222,560, filed on Aug. 3, 2000.

(51) Int. Cl.$^7$ .............................................. B60R 21/16
(52) U.S. Cl. ..................................... 280/743.2; 280/739
(58) Field of Search .............................. 280/739, 743.2, 280/743.1

(56) References Cited

U.S. PATENT DOCUMENTS

| | | | |
|---|---|---|---|
| 5,308,113 A | 5/1994 | Moriset | 280/743.2 |
| 5,489,119 A | 2/1996 | Prescaro et al. | 280/743.2 |
| 5,695,214 A | * 12/1997 | Faigle et al. | 280/739 |
| 5,762,367 A | 6/1998 | Wolanin | 280/743.2 |
| 5,887,894 A | * 3/1999 | Castagner et al. | 280/743.2 |
| 6,039,346 A | 3/2000 | Ryan et al. | 280/736 |
| 6,076,854 A | 6/2000 | Schenck et al. | 280/743.2 |
| 6,123,358 A | 9/2000 | Ryan et al. | 280/739 |
| 6,237,949 B1 | 5/2001 | Nozumi et al. | 280/735 |
| 6,334,627 B1 | * 1/2002 | Heym et al. | 280/728.1 |
| 6,390,501 B1 | 5/2002 | Greib et al. | 280/743.1 |
| 6,422,597 B1 | 7/2002 | Pinsenschaum et al. | 280/735 |
| 6,425,603 B1 | 7/2002 | Eschbach | 280/743.2 |

FOREIGN PATENT DOCUMENTS

| | | | |
|---|---|---|---|
| DE | 19756977 | 12/1997 | B60R/21/16 |
| DE | 19813832 | 3/1998 | B60R/21/16 |
| DE | 19926486 | 6/1999 | B60R/21/22 |
| GB | 2299550 | 4/1995 | B60R/21/16 |

* cited by examiner

Primary Examiner—Eric Culbreth
(74) Attorney, Agent, or Firm—Kathryn A. Marra

(57) ABSTRACT

An air bag assembly for cushioning restraint of an occupant in a vehicle during an impact event. The air bag assembly includes an inflator activatable to discharge inflation gas upon the occurrence of predetermined vehicle conditions and an air bag cushion including an interior surface in fluid communication with the inflator such that upon discharge of inflation gas from the inflator the air bag cushion is inflated to a deployed state. At least one profile restraining tether element is operatively connected to the air bag cushion such that the profile restraining tether element restrains the expansion of the air bag cushion upon introduction of the inflation gas to the air bag cushion. The profile restraining tether element is also releasably anchored to a substantially stationary retaining member so as to shorten the operative length of the profile restraining tether element such that the air bag cushion is inflatable to a first restrained depth when the profile restraining tether element is anchored to the retaining member. The profile restraining tether element is releasable from the retaining member upon the occurrence of predetermined occupant conditions at the time the air bag cushion is deployed such that the air bag cushion is inflatable to a second depth which is greater than the first restrained depth.

14 Claims, 6 Drawing Sheets

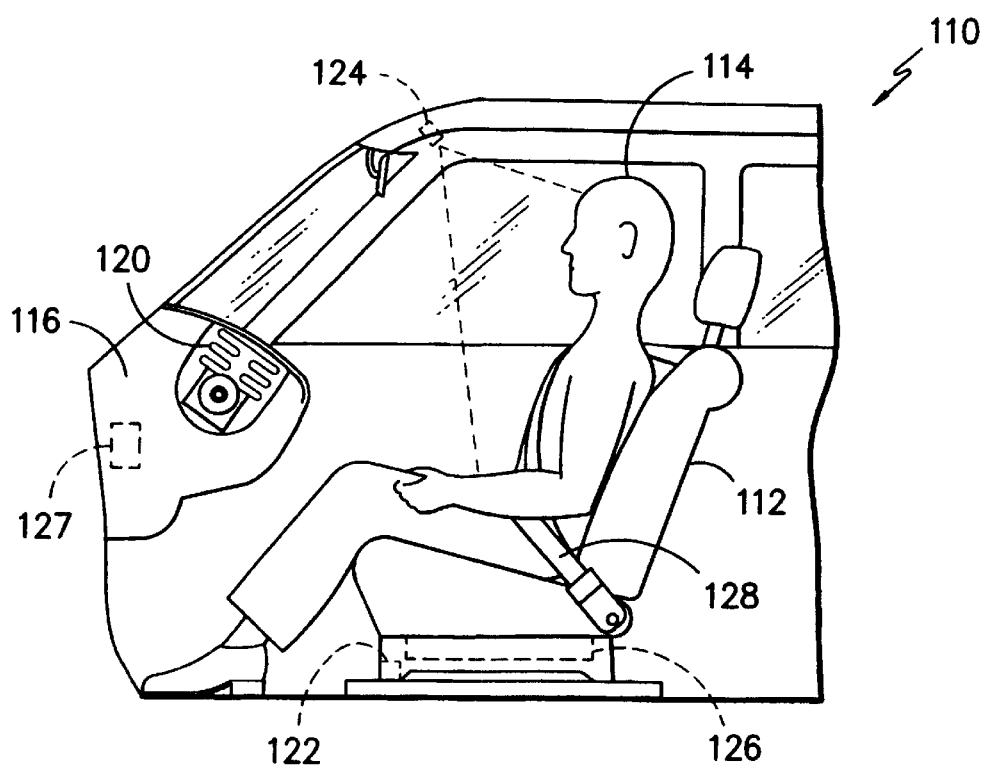
FIG. -1-

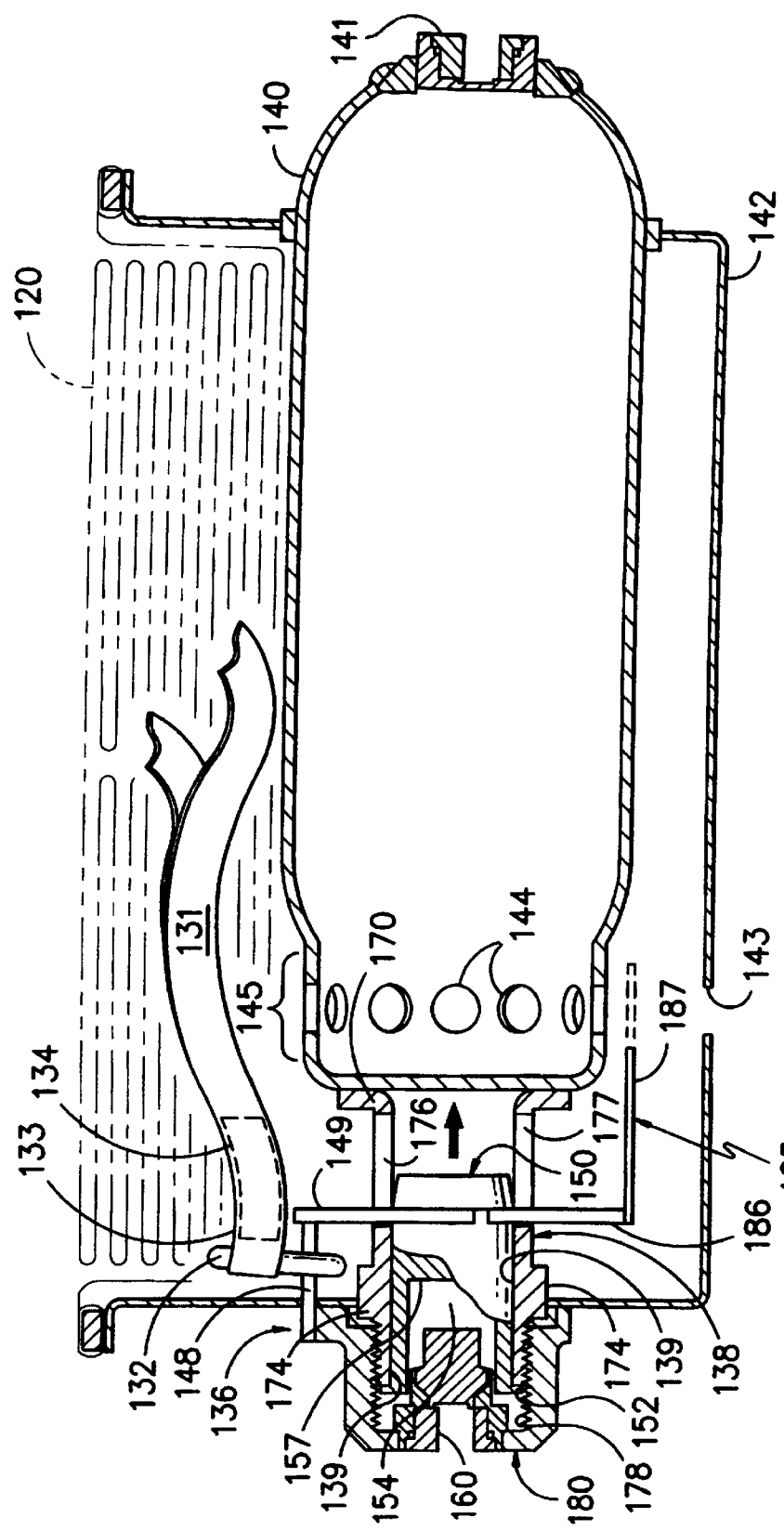
FIG. -2-

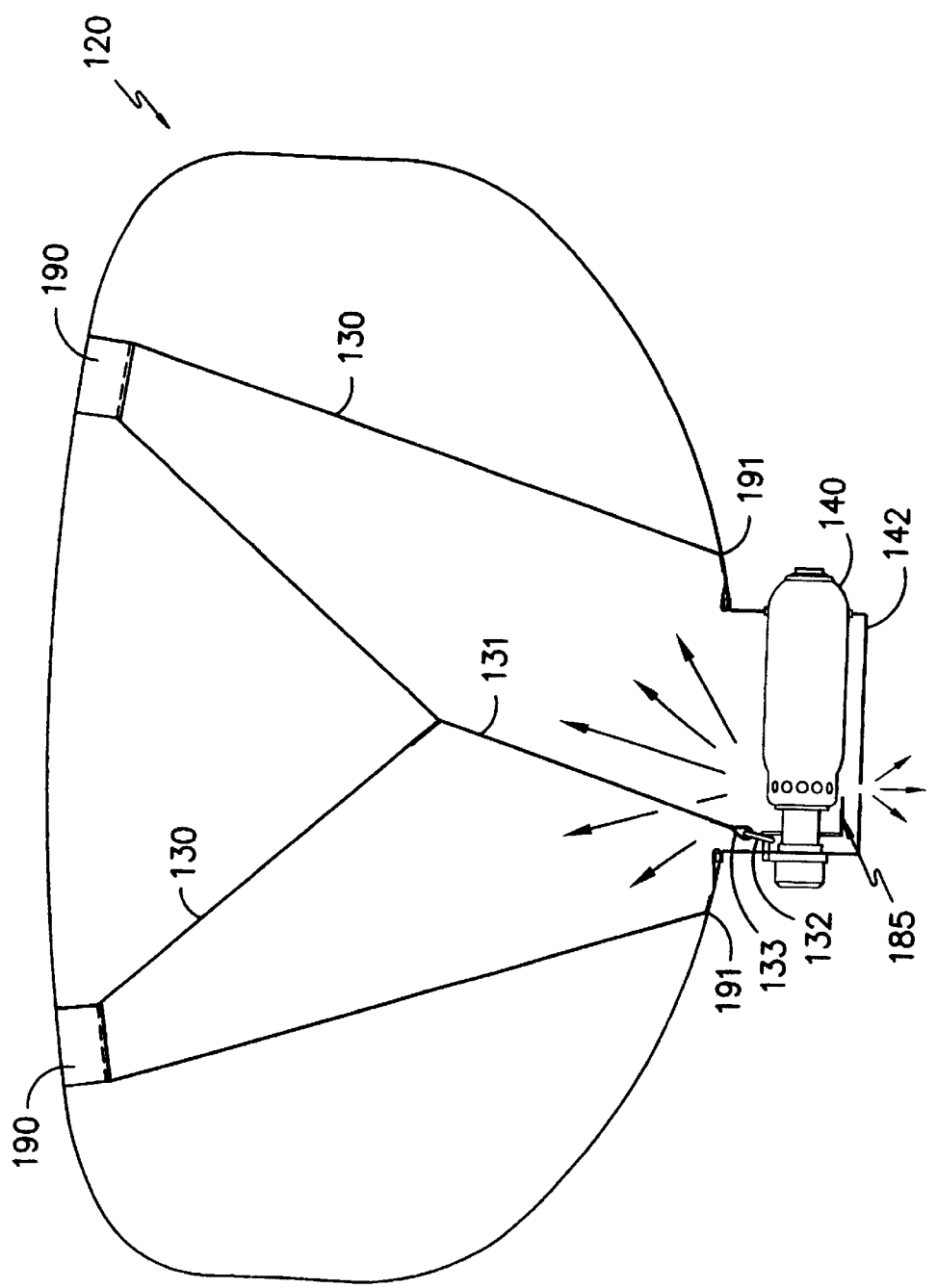

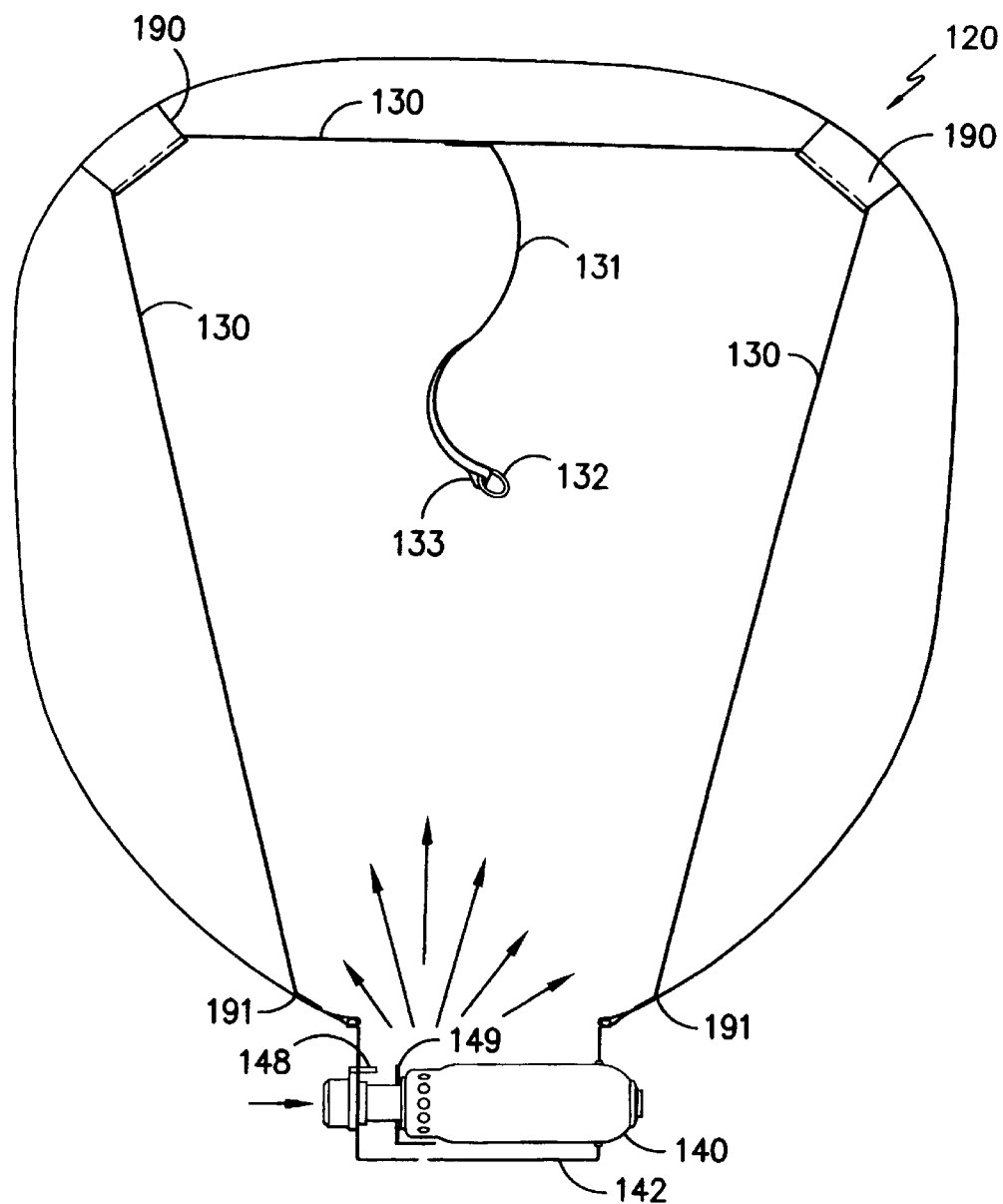
FIG. —3B—

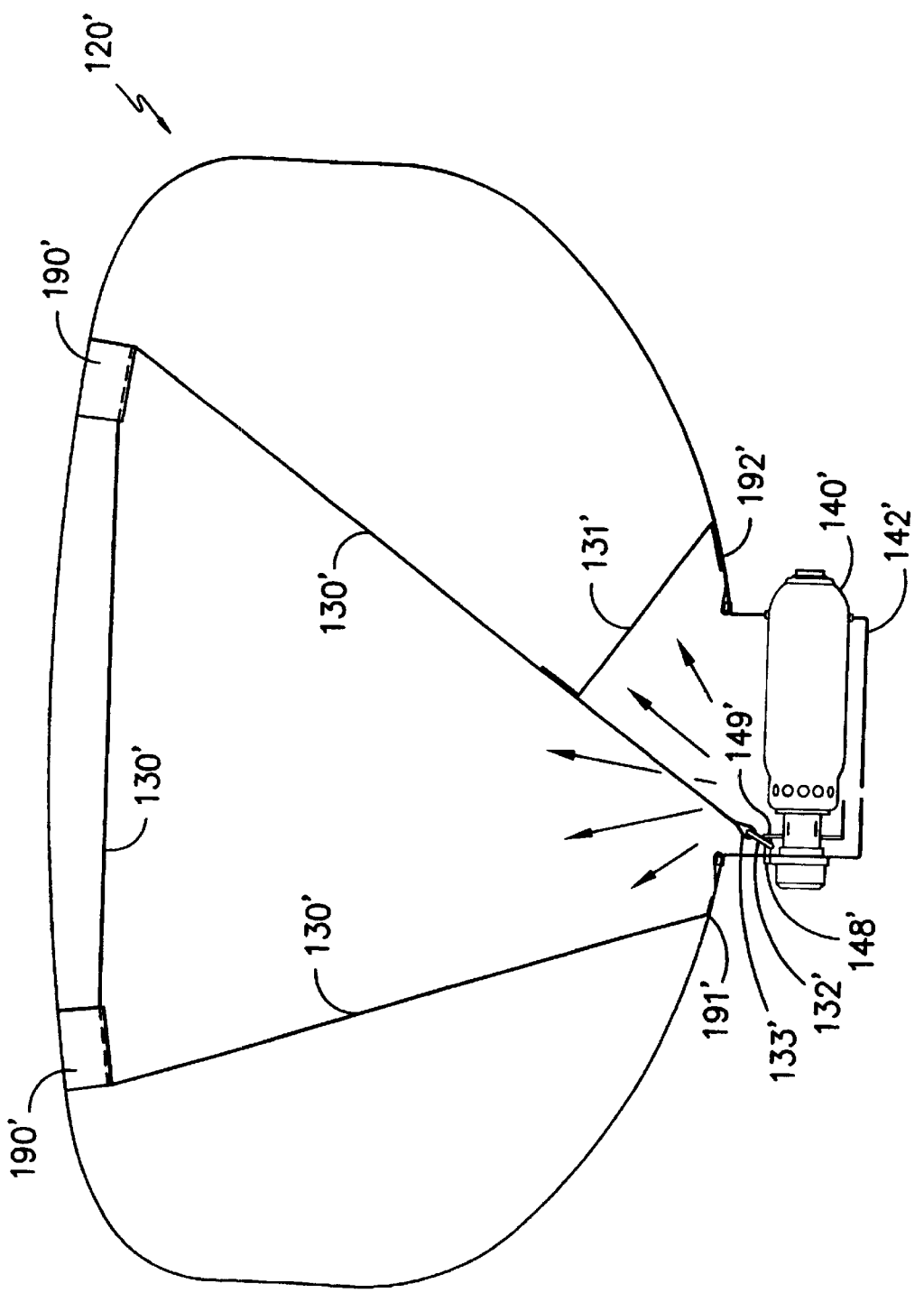
FIG. -4A-

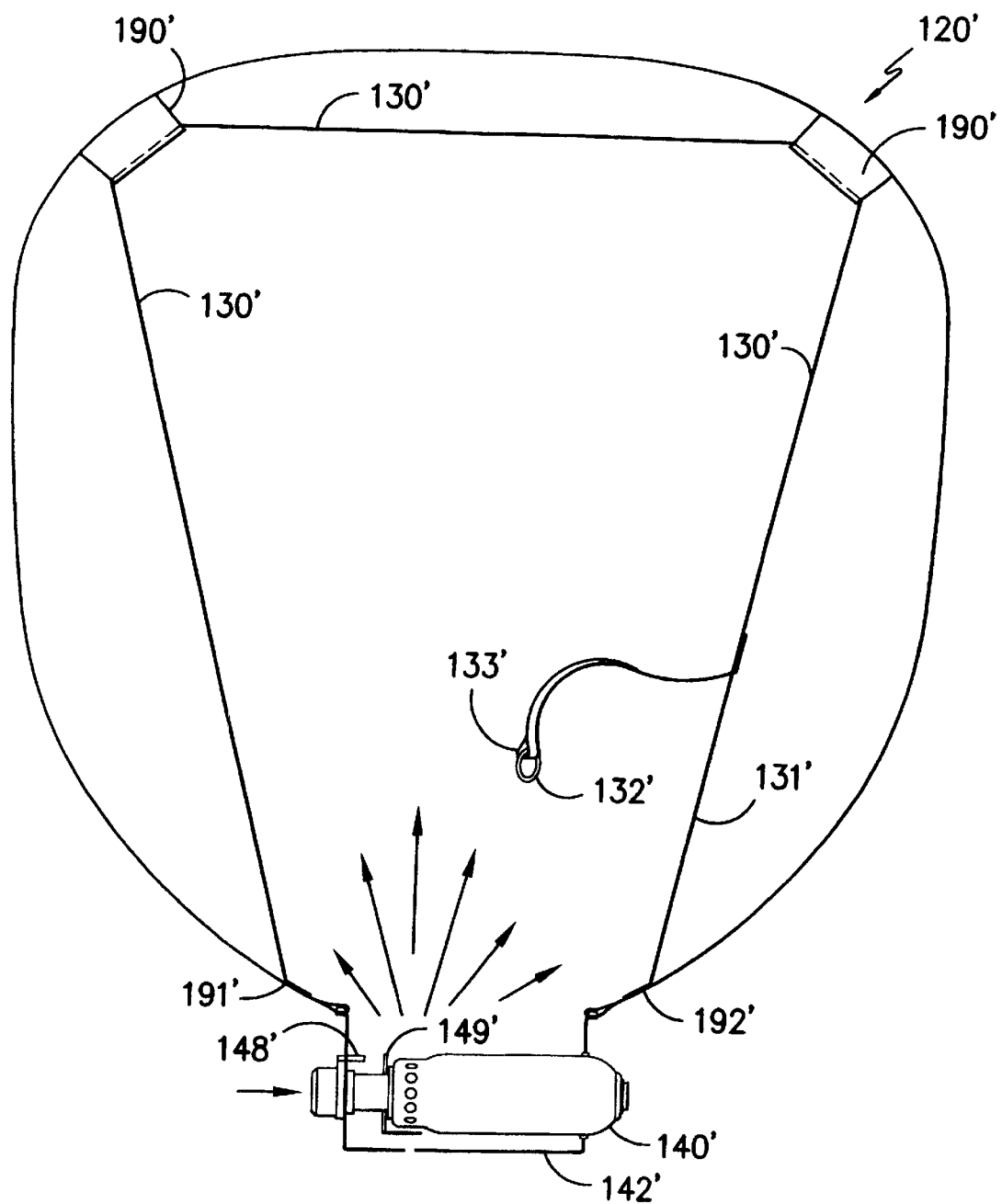
FIG. -4B-

VARIABLE PROFILE AIR BAG RESTRAINT

This application is a division of application Ser. No. 09/672,474 having a filing date of Sep. 28, 2000 which claims the benefit of previously filed U.S. provisional application Nos. 60/165,330 filed Nov. 12, 1999 and 60/222,560 filed Aug. 3, 2000 the teaching of which are all incorporated by reference.

TECHNICAL FIELD

This invention relates to an air bag restraint system, and more particularly to an air bag restraint system which controls the expansion characteristics of an inflatable air bag cushion discharged therefrom such that the inflated profile of the discharged air bag may be varied based upon the size and/or position of the vehicle occupant to be protected.

BACKGROUND OF THE INVENTION

It is well known in the prior art to provide an air bag assembly including an inflatable air bag for protecting the occupants of a transportation vehicle. In an automotive vehicle such air bag assemblies are typically located within the hub of the steering wheel and in a recess in the vehicle instrument panel for protection of the vehicle occupants seated in opposing relation to such assemblies. Additional air bag assemblies may be located within the seats and/or door panels for protection of the occupants during a side-impact event. It is also known to utilize inflatable curtain-like structures for deployment from the structural pillars or roof line of the motor vehicle so as to promote restraint and protection of the vehicle occupant during a roll-over event.

Air bag assemblies typically include an inflatable cushion in fluid communication with a gas emitting inflator. Upon sensing certain predetermined vehicle conditions, such as a certain amount of vehicle deceleration, the inflator discharges a fixed amount of inflator gas thereby forcing the air bag into a deployed position. The inflator gas occupies the available volume within the air bag cushion thereby forcing the air bag cushion to expand outwardly to the extent permitted by its construction. The pressure within the air bag cushion upon deployment is proportional to the quantity of inflator gas expelled into the air bag and inversely proportional to the volume occupied by the inflator gas within the air bag. As the occupant comes into contact with the expanded air bag, the inflator gas is forced out of the air bag thereby dissipating the kinetic energy of the occupant.

In some cases, it may be desirable to provide an inflator that has varied levels or stages of inflator gas output in response to the sensing of different vehicle or occupant conditions. Thus, it is generally known in the prior art to provide multi-stage inflators that discharge inflation gas at variable levels depending upon the conditions present during deployment. However, these multi-stage inflators are more complex than typical inflators. Moreover, the use of such multi-stage inflators provides control over only the amount of inflator gas which is discharged and does not provide control over the expanded geometry of the inflated air bag cushion. That is, so long as the air bag has a fixed expanded geometry, the inflator gas will tend to fill the available capacity and the expanded configuration of the air bag will be generally the same even if the quantity of inflator gas is varied although the pressure within the air bag will tend to differ appreciably.

In order to provide an additional degree of freedom in the control of air bag performance, it has been suggested to utilize air bag cushions which incorporate seams within the air bag to control the expanded geometry of the inflated air bag wherein the seams separate upon the introduction of sufficient force across the seams thereby freeing the air bag cushion from the restraint imposed by the seams at lower pressures. In order for such break-away seams to provide controlled expansion, the application of such seams must be performed with substantial precision such that seam separation will occur in a highly reproducible and predictable manner. As will be appreciated, due to the large number of variables involved in the introduction and separation of such break-away seams, such requisite precision and reproducibility may be difficult to achieve.

SUMMARY OF THE INVENTION

The present invention provides advantages and alternatives over the prior art by providing an assembly to vary the deployed profile of an air bag cushion which may be inflated to a controlled variable level using either a single stage or multi-stage inflator and which may be expanded preferentially in the depth direction towards the occupant to be protected without the need to rely exclusively on break-away seams. The present invention thereby provides an air bag cushion which may be deployed to a relatively shallow profile for protection of a small stature occupant or an occupant seated in close proximity to the air bag and which may also be deployed to a relatively increased depth for protection of a larger occupant or an occupant seated further away from the location of air bag deployment. According to a potentially preferred feature, the present invention further provides a mechanism for simply and effectively controlling both the profile of the deployed air bag cushion and the quantity of inflation gas released into the air bag cushion.

According to one potentially preferred feature, this invention provides an assembly to deploy an air bag cushion to a controlled geometry of a depth which is desired in view of the position and/or size of the occupant to be protected such that an air bag of substantial depth is available to protect occupants such as larger stature persons who may be seated further away from the location of cushion deployment, while a smaller air bag volume of diminished depth is available to protect occupants such as smaller stature persons who may be seated closer to the location of cushion deployment.

According to a further potentially preferred feature, the present invention may provide an effective mechanical actuation mechanism to adjust the deployment characteristics of the air bag cushion which actuation mechanism is not dependent upon a particular cushion construction technique and which may be activated based upon measured parameters of the occupants to be protected and/or upon the severity of the collision event taking place.

According to yet a further potentially preferred feature of the present invention, the actuation mechanism to control the deployed profile of the air bag cushion may be operated either independently or in conjunction with a device to adjust the level of inflator gas which enters the air bag cushion thereby providing additional versatility of operation. Conjunctive operation may be carried out utilizing a single common initiator such as a pyrotechnic squib. Thus, it is a feature of the present invention that the air bag assembly may incorporate as few as two initiators. That is, one initiator is used to activate the inflator and one initiator is used to initiate the actuation mechanism to control the deployment profile of the air bag and the level of inflation gas which enters the air bag.

According to a further potentially preferred feature of the present invention, the actuation mechanism to control the deployed profile and level of inflation gas may be mounted externally on the inflator or the supporting housing thereby avoiding any need to substantially modify the shape or construction of the inflator housing. In addition, the actuation mechanism and variable profile air bag of the present invention may be used in conjunction with traditional single stage inflators without requiring internal modifications to such inflators.

According to one aspect of the present invention, these advantages and features are accomplished in a potentially preferred form of the present invention by providing an inflatable air bag expandable to a first volume and depth which first volume and depth may be restrained to a second diminished volume and depth by tethers which are attached at locations across the surface of the air bag cushion and which are releasably attached to a releasable anchor assembly independent from the air bag cushion. Based upon appropriate measured parameters such as the size and/or position of the occupant to be protected, the severity of the collision event and/or the use or nonuse of recommended seat belts, an actuation mechanism which releases the tethers from the anchor assembly may be either activated or may remain deactivated to yield a deployed air bag cushion of desired volume and geometric configuration. The volume of inflation gas entering the air bag cushion may be adjusted simultaneously with the profile of the air bag cushion.

According to the potentially preferred form of the invention, the actuation mechanism will remain deactivated and thereby result in a constrained final expanded geometry in the event that the occupant to be protected is either of small stature and/or is seated in a position close to the location of air bag deployment or has traveled into such a close position as a result of nonuse of a safety harness. In the event that the occupant to be protected is of larger stature and/or is seated further away from the location of air bag deployment, the actuation mechanism may be activated to at least partially eliminate volumetric restraint thereby permitting the air bag to expand to a greater volume and depth so as to provide additional cushioning for such an occupant.

Thus, it will be appreciated that variable expanded geometries may be achieved in the inflated air bag with such geometries being controllable and adjustable based upon the parameters of the occupant to be protected and the collision event taking place. Such control is preferably achieved through use of one or more mechanical actuation mechanisms which are either activated or deactivated to effect control of the inflatable air bags by either holding or releasing tethering restraint elements from an anchoring location remote from the air bag cushion.

Since the activation or deactivation of the actuation mechanism is carried out in conjunction with deployment of the air bag cushion, the necessary geometric character may be achieved for a given occupant as may be present within the vehicle at the time of deployment. Thus, the variable air bag and actuation mechanism according to the present invention offers substantial versatility in the protection of large numbers of diverse occupants including very small and very large occupants. It will also be appreciated that this system provides a simple, cost effective and highly reproducible system for controlling the volume of deployed air bag cushions even when using a traditional single stage inflator.

BRIEF DESCRIPTION OF THE DRAWINGS

The present invention will now be described by way of example only, with reference to the accompanying drawings which constitute a part of the specification herein and in which:

FIG. 1 is a cut-away view of a vehicle interior showing an air bag cushion in a stored undeployed state in opposing relation to a vehicle occupant;

FIG. 2 is a cut-away view of an air bag module including an inflator and an actuation mechanism for controlling the expansion of a variable profile air bag as well as controlling the quantity of inflator gas which enters the variable profile air bag;

FIG. 3A illustrates an arrangement of profile restricting tethers as may be utilized in a variable profile air bag wherein the air bag is restrained to a diminished profile;

FIG. 3B is a view similar to FIG. 3A, wherein the air bag is in an expanded profile configuration;

FIG. 4A illustrates an arrangement of profile restricting tethers as may be utilized in a variable profile air bag, wherein the air bag is restrained to a diminished profile; and FIG. 4B is a view similar to FIG. 4A, wherein the air bag is in an expanded profile configuration.

While the invention has been illustrated and generally described above and will hereinafter be described in connection with certain potentially preferred embodiments, it is to be understood that in no event is the invention to be limited to such illustrated and described embodiments. On the contrary, it is intended that the present invention shall extend to all alternatives and modifications as may embrace the principles of this invention within the true spirit and scope thereof.

DESCRIPTION OF THE PREFERRED EMBODIMENTS

Turning now to the drawings, wherein to the extent possible like reference numerals are utilized to designate like components throughout the various views, in FIG. 1 it is seen that a vehicle 110 may include a seating structure 112 which supports an occupant 114 in generally opposing relation to an instrument panel 116. An inflatable air bag 120 may be housed within the instrument panel 116 for outward deployment towards the occupant 114 in the event of a collision.

While the air bag 120 is illustrated for descriptive purposes in relation to a vehicle passenger, it is to be understood that the present invention is in no way intended to be limited to a passenger side configuration. On the contrary, it is contemplated that the present invention may have equal applicability to air bag deployment in opposing relation to the operator (not shown) of the vehicle from the steering column (not shown) as well as in relation to air bags deployed from other regions within the vehicle interior including, by way of example only, side-impact air bags and inflatable curtain structures.

It is contemplated that the vehicle interior will preferably include a seat position sensor 122 as the primary means of detecting the position of the occupant 114 relative to the instrument panel 116. It is further contemplated that the vehicle 110 may include additional position sensors such as an optical scanner 124 or the like to measure both the volume and position of the occupant to be protected. It is contemplated that the interior of the vehicle 110 may also be provided with a scale 126 disposed within the seating structure 112 so as to provide additional data regarding the load to which the inflatable air bag 120 may be subjected. The seating structure 112 may also be provided with sensing elements to measure the degree to which the seating structure 112 is reclined. A deceleration meter 127 as will be well known to those of skill in the art may be utilized to measure the relative severity of the collision event which may give rise to the deployment of the inflatable air bag 120. The vehicle 110 may also be provided with sensors to determine and communicate whether or not the occupant is utilizing the recommended seat belt structures 128. The data so collected may be utilized to determine desirable expanded profile characteristics for the air bag 120 according to the present invention.

In general, it is believed that in some instances persons of small stature may benefit if the air bag 120 according to the present invention is of a reduced profile upon deployment due to the fact that such occupants have a lower body mass and are generally seated in closer proximity to the instrument panel 116. Conversely, it is believed that in some instances, occupants of larger stature may benefit from a deeper profile air bag 120 due to their enhanced mass and propensity to be positioned further from the location of air bag deployment. However, in the event that a person of smaller stature is seated at a remote distance from the location of air bag discharge, the air bag 120 will preferably assume an extended profile so as to span the distance between the occupant and the location of discharge. Likewise, a person of larger stature who is seated in unusually close proximity to the location of air bag discharge may benefit from a shallow inflated profile.

The determination of the potentially desirable profile character of the air bag 120 for various occupants seated in various positions may be determined based upon event simulations utilizing so-called "crash dummies" of various sizes in various positions within the vehicle 110. Such size and position parameters may be stored along with corresponding desired gas emission characteristics within an electronically accessible storage registry for access by a processing unit such as an on-board computer during a collision event. During such an event, the position of the occupant 114 as measured by the seat position sensor 122 as well as any other sensors as may be utilized will be correlated to corresponding values as archived within the storage registry thereby providing data on the desired profile characteristics of the air bag 120 for the occupant 114 based on the conditions of the occupant 114 including the severity of the collision event to which the occupant 114 is being subjected and his or her relative orientation within the interior of the vehicle 110 at the time the event takes place.

According to a potentially preferred form of the invention, the air bag 120 will have a first expanded profile which is restrained to some degree by tethered restraints 130 (FIGS. 3B, 4B) and at least a second expanded profile which is characterized by less depth and lower volume than the first expanded profile (FIGS. 3A, 4A). Such diminished profile and volumetric capacity is preferably achieved by anchoring the tethered restraints to some releasable anchoring point remote from the air bag thereby shortening the operative length of tethered the restraints 130 which control the expanded profile of the air bag 120. The operative length of the restraints 130 is lengthened when such tethered restraints 130 are released from the anchoring point in the manner to be described further hereinafter. However, such tethered restraints preferably continue to provide some degree of restraint over the profile of the air bag 120 subsequent to release from the anchoring point.

For a given collision event, the release or retention of the tethered restraints 130 is preferably carried out during inflation of the air bag 120 based upon the preferred profile character of the air bag 120 in view of the measured physical character and position of the occupant 114. That is, if the physical character and orientation of the occupant 114 are such that previously collected data indicates that a deep profile and corresponding larger volume are desired for the inflatable air bag 120, then the tethered restraints 130 are released from their anchored position during inflation thereby permitting the inflatable air bag 120 to assume an expanded enhanced profile. Conversely, in the event that the physical character and orientation of the occupant 114 is such that the inflatable air bag 20 is preferably of a more shallow profile and lower volume, then the tethered restraints 130 will remain anchored during deployment of the inflatable air bag 120 so as to restrain the final profile thereof.

Looking to FIGS. 2, 3A, and 3B, the tethered restraints 130 may be attached to an anchor strap 131 as shown. The anchor strap 131 preferably formed into a loop 133 which is optionally held within a ring element 132. As shown, in the event that a ring element is utilized, the attachment between the ring element 132 and the anchor strap 131 may be attained by passing the anchor strap through the opening at the interior of the ring element 132 so as to form the loop 133 which can slide along the length of the ring element 132. The configuration of the loop 133 is thereafter maintained by attaching the overlapping portions of anchor strap 131 to one another along a length remote from the loop 133. The joiner between portions of the anchor strap 131 to maintain the looped configuration may be by any suitable joining technique as may be known to those of skill in the art including, by way of example only, the application of a sewn seam 134 as may be applied using industrial sewing equipment. Other modes of attachment may include adhesive bonding, ultrasonic welding, RF welding, and combinations thereof. As will be appreciated, while the use of an anchoring strap 131 may be desirable in some instances to connect the tethered restraints 130 to a releasable anchor point, it is likewise contemplated that such an anchor strap may be eliminated if desired in which instance the tethered restraints may be attached directly to the releasable anchor.

The material forming the tethered restraints 130 and the anchor strap 131 is preferably of pliable nature such as a woven or knitted textile of construction resistant to substantial elongation upon the application of tensile forces. A woven structure of nylon yarns may be preferred.

In the event that a ring element 132 is utilized, it is preferably formed from a smooth surface material of high strength such as metal or the like. Such materials have the ability to withstand substantial loading without undergoing plastic deformation. As will be discussed further hereinafter, the ring element 132 may pass in sliding relation over a stationary retaining member which extends through the opening in the ring element 132 such that the ring element 132 may be pulled away from the retaining member when tension is applied to the anchor strap 131. In the event that a ring element 132 is not utilized, it is contemplated that this function may be carried out by the loop 133 which may likewise accept the retaining member therein. Thus, it is to be appreciated that the use of the ring element 132 is in no way considered to be critical to the performance of the present invention. Moreover, while the illustrated and potentially preferred embodiment utilizes a female member such as the ring element 132 or loop 133 disposed in sliding relation over a male retaining member, it is likewise contemplated that such female elements may be substituted with a male element for disposition in sliding relation within a supporting female retaining member if desired.

As best seen in FIG. 2, according to one embodiment of the present invention, an actuation mechanism 136 including a support structure 138 is operatively connected to a gas emitting inflator 140 which is activated by an initiator 141 such as a pyrotechnic squib or other suitable device as will be well known to those of skill in the art. The gas emitting inflator 140 is stored within a housing 142 which may include one or more vent openings 143 for transmission of inflator gas outwardly from the module away from the air bag 120. As illustrated, such vent openings 143 are normally in fluid communication with gas discharge ports 144 generally surrounding the diffuser portion 145 of the inflator 140. As will be appreciated, while the support structure 138 of the actuation mechanism 136 is illustrated as being connected to the gas emitting inflator 140, it is likewise contemplated that any number of other arrangements may also be utilized. By way of example only, it is contemplated that the actuation mechanism 136 may be located remote from the inflator 140 and attached directly to the housing 142.

According to the illustrated embodiment, the ring element 132 or loop 133 on the anchor strap 131 is disposed in sliding relation over a restraining stud 148 which is secured in substantially stable relation to the housing 142. The restraining stud 148 is disposed in butting or notched relation to a tether blocking element 149 such as a plate or notched post. As will be appreciated, in such an arrangement the ring element 132 or loop 133 will be anchored in place with the restraining stud 148 and tether blocking element 149 preventing the withdrawal of the ring element 132 or loop 133 thereby holding the anchor strap 131 in place. The tethered restraints 130 which are fixedly attached to the anchor strap 131 will likewise be anchored against outward movement as best seen in FIG. 3A. Accordingly, the expanded profile of the air bag 120 is limited due to the anchored relation between the anchor strap 131 and the stationary restraining stud 148.

According to the illustrated embodiment, the tether blocking element 149 is carried within a plunger element 150 which is held within the interior of the support structure 138 at the end of the inflator 140. The support structure 138 preferably has a substantially hollow tubular shape including interior walls 139 defining an axial opening into which the plunger element 150 and an initiator device 160 may be inserted during assembly.

The support structure 138 preferably includes a first support end 170 of a substantially flanged configuration that is secured directly to the head portion of the inflator 140. The first support end 170 of the support structure 138 may be secured to the inflator 140 by any suitable method, such as welding. The support structure 138 also preferably includes a spacing shoulder 174 which is sized larger than an end opening in the housing 142 such that the support structure 138 is limited from going through the end opening within the housing 142 and is properly positioned during assembly. The spacing shoulder 174 is preferably integrally formed with the support structure 138 such as by machining or molding but may also be provided as a separate piece attached to or slipped over the support structure 138. In the installed condition, the spacing shoulder 174 preferably abuts an end wall of the housing 142.

According to the illustrated embodiment, the support structure 138 is externally attached to the inflator 140 and may be provided as an assembly with the inflator 140 or may alternatively be integrally formed with the inflator 140. The support structure 138 preferably includes a first guide channel 176 which extends longitudinally along at least a portion of the distance between the spacing shoulder 174 and the first support end 170 of the support structure 138 such that the tether blocking element 149 passes through the first guide channel 176 and into the plunger element 150 as shown. The support structure 138 further preferably includes a threaded end portion 178 which extends past the spacing shoulder 174 through the end opening of the housing 142 for mating with a cap nut 180 to secure the inflator 140 and the actuation mechanism 136 to the housing 142.

The plunger element 150 is preferably integrally formed from a plastic material and has a generally cylindrical shape. The plunger element 150 is preferably seated within the interior walls 139 of the support structure 138 and has a diameter which is slightly smaller than the axial opening between the interior walls 139 such that the plunger element 150 is slidable relative to the interior walls 139. The plunger element 150 includes at least a first radial opening which is sized for the receipt of the tether blocking element 149. The plunger element 150 may also include a second radial plunger hole for the receipt of a moveable vent blocking device 185 the operation of which will be described further hereinafter. However, it is also contemplated that the actuation mechanism 136 or such other mechanism as may be used to regulate the expanded configuration of the air bag 120 may be operated without such a moveable vent blocking element 185 if desired. The elements received within the linear plunger element 150 may be secured in place by snap-fitted attachment, although it will be appreciated that other methods of attachment including by way of example only crimping, fastening, or adhesion may also be utilized to obtain secure attachment.

As shown, the plunger element 150 includes a shear feature 152 which is illustrated as a flange located at the end of the plunger element 150. The shear feature 152 is preferably integrally formed with the plunger element 150, but may also be a separate piece attached to the plunger element 150. The shear feature 152 is sized larger than the axial opening within the support structure 138 such that the shear feature 152 engages the support structure 138 during insertion to limit the insertion of the plunger element 150 into the support structure 138.

The plunger element 150 preferably includes an axial plunger bore 154 in which the initiator device 160 such as a pyrotechnic squib, pneumatic actuator or the like is seated prior to activation. The initiator device 160 preferably is activated in response to a signal from a control device such as an on-board computer (not shown) based upon inputs from the seat position sensor 122, optical scanner 124 and any other sensor as may be used to measure the nature of the occupant and the severity of the event taking place. Upon activation, the initiator device 160 produces a pressure wave that presses against a plunger reaction surface 157. The application of such force causes the shear feature 152 to break off and permits the plunger element 150 to slide within the support structure 138 until engaging the head of the inflator 40 which acts as a stop surface.

In the event that a vent blocking element 185 is to be utilized in conjunction with the actuation mechanism 136, the vent blocking element 185 will preferably include an upwardly projecting arm portion 186 which may be snap fittedly attached in the plunger element 150. The vent blocking element 185 will also preferably include a slide portion 187 extending at generally a right angle to the arm portion 186. Thus, in the illustrated embodiment wherein the vent blocking element 185 is to be utilized, the restraining stud 148, tether blocking element 149, and vent blocking element 185 are arranged in a substantially "Z" shaped cross sectional profile.

The slide portion 187 preferably has a generally curved shape such that allows the insertion into the housing 142 through round end wall openings during the assembly process. The vent blocking element 185 is preferably moveable within a second guide channel 177 within the support structure 138 so as to close an inflator vent opening 143 upon activation of the initiator device 160. In FIG. 2, the slide portion 187 is shown in a first position in solid lines in which the inflator vent opening 143 is open thereby lowering the amount of gas available for inflation of the air bag 120 and is illustrated in phantom lines in a second position in which the slide portion 187 is blocking the inflator vent opening 143 within the housing 142 thereby directing a larger quantity of available inflator gas into the air bag 120.

Prior to activation of the inflator 140 the air bag 120 is stored in a folded condition atop the inflator 140. Also, prior to activation of the inflator 140, the tether blocking element 149 as well as the optional vent blocking element 85 are held in a first position by the shear feature 152 such that the restraining stud 148 and tether blocking element 149 hold the anchor strap 131 in place. In addition, the slide portion 187 of the vent blocking element 185 is misaligned with the inflator vent opening 143 such that the inflator vent opening 143 is open thereby permitting the egress of inflator gas outwardly from the housing 142.

Upon sensing predetermined vehicle and occupant conditions, a signal is sent to the inflator initiator 141 thereby activating the inflator 140. Based upon the measurement of occupant conditions including the position and/or physical character of the occupant 114 as measured by the seat position sensor 122, optical scanner 124 and other sensors as may be utilized, a signal is also sent to the initiator device 160 advising the initiator device 160 as to whether the first position is to be maintained or whether the initiator device 160 is to be activated at a predetermined time during activation of the inflator 140 to move the tether blocking element 149 thereby permitting the anchor strap 131 to slide away from the restraining stud 148. According to the potentially preferred arrangement, the initiator device 160 will be activated when conditions indicate that an air bag of deeper profile and larger volume is required and will remain in a deactivated state when conditions indicate that an air bag of more shallow profile and lower volume is desirable.

As previously indicated, upon activation the initiator device 160 produces a pressure wave which presses against the reaction surface 157 of the plunger element 150 and quickly forces the plunger element 150 towards the head portion of the inflator 140. This movement carries the tether blocking element 149 as well as any optional vent blocking element 185 within the plunger element 150 from the first position illustrated in FIG. 2 to a second position wherein the plunger element 150 is in contact with the head portion of the inflator 40. Such movement rapidly opens a path of egress for the ring element 132 or loop 133 disposed over the restraining stud 148 thereby permitting the ring element 132 or loop 133 to slide out of engagement with the restraining stud 148 as tension is applied to the anchor strap 131. This tension arises due to the outward expansion of the air bag 120 as it is filled with inflator gas. Preferably such tension will include both a horizontal as well as a vertical force component arising from the angled relation between the anchor strap 131 and the restraining stud 148 so as to promote sliding disengagement from the restraining stud 148. Simultaneously with such disengagement, the vent blocking element 185 covers the vent opening 143 thereby increasing the quantity of inflation gas available to inflate the air bag 120.

In FIG. 3A the air bag 120 of FIG. 2 is illustrated in an inflated restrained condition wherein an arrangement of tether elements 130 is held in a shortened configuration at the restraining stud 148. As shown, according to the illustrated arrangement the tether elements 130 are formed from a length of material which preferably passes in sliding relation through loop structures 190 at the surface of the air bag cushion 120. In addition, the tether elements 130 are preferably fixedly attached at their ends to secure points of attachment 191 which may be either internal or external to the air bag 120. Attachment using sewn seams at the interior of the air bag 120 may be preferred although other means of attachment as are known to those of skill in the art may also be used.

According to the illustrated embodiment, the portion of the tether elements 130 between the loop structures 190 is drawn down to the restraining stud 148 either directly or via the anchor strap 131 and held in a shortened condition by the restraining stud 148. This drawing operation is made possible by the sliding relation between the tether elements 130 and the loop structures 190 at the surface of the air bag 120. As will be appreciated, as the tether elements 130 are pulled towards the restraining stud 148 the effective length of the tether elements is diminished thereby diminishing the available depth of the air bag 120. However, the air bag 120 is nonetheless capable of outward expansion to the degree permitted by the remaining length extending through the loop structures 190 between the secure points of attachment 191. While only a single length of tether material extending through two loop structures is illustrated, it is likewise contemplated that additional lengths of tether forming material extending through additional loops may also be utilized to obtain expansion characteristics as may be desired.

As illustrated in FIG. 3B, upon release of the tether elements 130 from restraint at the restraining stud 148 in the manner as described above, the air bag 120 expands outwardly to an extended profile as the tether elements slide through the loop structures 190. However, according to the potentially preferred arrangement, the extended profile is nonetheless restrained to some degree by the secure attachment of the ends of the tether elements 130 at the secure points of attachment 191. The maintenance of such a tethering relationship permits the air bag 120 to adopt a generally deep elongated profile as shown without requiring the actual volumetric capacity to be substantially increased. The actual increase in such volumetric capacity is contemplated to be in the range of about 25% or less and may be in the range of about 15% or less.

In FIG. 4A there is illustrated another variable profile air bag arrangement wherein elements are designated by like reference numerals to those used in FIGS. 3A and 3B but with a prime. As shown, according to this embodiment, a length of material forming the tether element 130' is preferably passed in sliding relation through two loop structures 190' such as sewn loops of textile material on the surface of the air bag 120'. One end of the tethering element 130' is held in place at a point of secure connection 191' which may be either internal or external to the air bag 120'. The other end of the tethering element 130' is held in place by the ring element 132' or formed loop 133' at the restraining stud 148' between the end wall of the housing 142' and the tether blocking element 149'. As illustrated, such an arrangement gives rise to an increased horizontal force component when tension is applied by the expansion of the air bag 120'. An anchor strap 131' joins the section of the tethering element 130' adjacent to the connection with the retaining stud 148' to a point of secure connection 192'. As will be appreciated, it is contemplated that the relative position of the loop structures 190' and the points of secure connection 191' and 192' may be reversed if desired.

As illustrated in FIG. 4B, upon release of the tether element 130' from the restraining stud 148' in the manner as described above, the air bag 120' expands outwardly to an extended profile. However, according to the potentially preferred arrangement, the extended profile is nonetheless restrained by the secure attachment of the tether element 130' and the anchor strap 131' at their respective secure points of attachment 191', 192'. The maintenance of such a tethering relationship permits the air bag 120' to adopt a generally deep elongated profile as shown without requiring the actual volumetric capacity to be substantially increased. The actual increase in such volumetric capacity is contemplated to be in the range of about 25% or less and may be in the range of about 15% or less.

As will be appreciated, the enhanced angled relation of the tether element 130' with respect to the restraining stud 148' enhances the horizontal component of the force vector extending along the tether element 130' when the tether element 130' is placed into tension as the air bag 120' is deployed. This enhanced horizontal force component is believed to aid in the sliding disengagement of the tether element 130' away from the restraining stud 148'. In addition, the use of the restraining strap 131' provides additional control over the tether element 130' and any ring element 132' as may be utilized. While only a single length of tether material extending through two loop structures is illustrated, it is likewise contemplated that additional lengths of tether forming material extending through additional loops may also be utilized to obtain expansion characteristics as may be desired.

It is contemplated that the use of the variable profile air bag according to the present invention will permit a single cushion to be utilized to effectively protect a wide range of occupants by having the air bag conform to the requirements of such occupants. In particular, it is contemplated that it will be possible to avoid substantial divergence between the forces to which occupants of different physical dimensions may be subjected during interaction with the air bag.

As indicated previously, while measurements relating to the position and/or size of the occupant to be protected may be used to determine whether or not to release the profile restraining tether elements during an impact event of given severity, it is likewise contemplated that other factors may also be utilized. By way of example only, it is contemplated that the velocity of the vehicle 110 may be used as an overriding factor in the determination as to whether or not an enhanced profile is desired. In particular, it is contemplated that minimum velocity thresholds may be preprogrammed into the on-board computer or other control device as may be utilized such that enhanced profile will not be obtained if the vehicle is traveling at a very low velocity which is likely to give rise to a collision of low severity.

It is to be understood that while the present invention has been illustrated and described in relation to potentially preferred embodiments, constructions, and procedures, that such embodiments, constructions, and procedures are illustrative only and that the present invention is in no event to be limited thereto. Rather, it is contemplated that modifications and variations embodying the principles of the present invention will no doubt occur to those of skill in the art. It is therefore contemplated and intended that the present invention shall extend to all such modifications and variations as may incorporate the broad aspects of the present invention within the full spirit and scope thereof.

What is claimed is:

1. An air bag assembly for cushioning restraint of an occupant in a vehicle during an impact event, the air bag assembly comprising:

an inflator activatable to discharge inflation gas upon the occurrence of predetermined vehicle conditions;

an air bag cushion including an interior surface in fluid communication with the inflator such that upon discharge of inflation gas from the inflator the air bag cushion is inflated to a deployed state from a location of deployment in substantially opposing relation to the occupant;

at least one profile restraining tether element operatively connected to the air bag cushion such that the profile restraining tether element restrains the expansion of the air bag cushion upon introduction of the inflation gas to the air bag cushion, the profile restraining tether element further being releasably anchored at a first anchoring element comprising a fixed position retaining member so as to shorten the operative length of the profile restraining tether element such that the air bag cushion is inflatable to a first restrained depth when the profile restraining tether element is anchored to the fixed position retaining member, the profile restraining tether element further being fixedly anchored at a secondary anchoring location separate from the fixed position retaining member, the profile restraining tether element being releasable from the fixed position retaining member upon the occurrence of predetermined occupant conditions at the time the air bag cushion is deployed such that the air bag cushion is inflatable to a second restrained depth which is greater than said first restrained depth when said predetermined occupant conditions occur and such that the profile restraining tether element fixedly anchored at the secondary anchoring location; and an actuatable variable inflation device to control the amount of inflation gas discharged into the air bag cushion wherein the variable inflation device is actuated in conjunction with the release of the profile restraining tether element from the retaining member using a single initiator to both actuate the variable inflation device and to release the profile restraining tether element.

2. The invention as recited in claim 1, wherein the secondary anchoring location comprises a fixed point of connection on the air bag cushion.

3. The invention as recited in claim 1, wherein the initiator comprises a pyrotechnic squib.

4. The invention as recited in claim 1, wherein the initiator is activatable in response to a signal based upon input data from one or more sensors measuring conditions of the occupant.

5. The invention as recited in claim 1, wherein the fixed position retaining member comprises an elongate stud adapted to slidingly engage a female acceptance member disposed along the profile restraining tether element.

6. An air bag assembly for cushioning restraint of an occupant in a vehicle during an impact event, the air bag assembly comprising:

an inflator activatable to discharge inflation gas upon the occurrence of predetermined vehicle conditions;

an air bag cushion including an interior surface in fluid communication with the inflator such that upon discharge of inflation gas from the inflator the air bag cushion is inflated to a deployed state from a location of deployment in substantially opposing relation to the occupant;

at least one profile restraining tether element operatively connected to the air bag cushion such that the profile restraining tether element restrains the expansion of the air bag cushion upon introduction of the inflation gas to the air bag cushion, the profile restraining tether element further being releasably anchored at a first anchoring element comprising a fixed position retaining member so as to shorten the operative length of the profile restraining tether element such that the air bag cushion is inflatable to a first restrained depth when the profile restraining tether element is anchored to the fixed position retaining member, the profile restraining tether element further being fixedly anchored at a secondary anchoring location separate from the fixed position retaining member, the profile restraining tether element being releasable from the fixed position retaining member upon the occurrence of predetermined occupant conditions at the time the air bag cushion is deployed such that the air bag cushion is inflatable to a second restrained depth which is greater than said first restrained depth when said predetermined occupant conditions occur and such that the profile restraining tether element remains fixedly anchored at the secondary anchoring location;

an actuatable inflation control device; and an actuation mechanism including an initiator activatable in response to a signal based upon input data from one or more sensors measuring conditions of the occupant such that the actuation mechanism releases the profile restraining tether element from the retaining member and conjunctively directs additional inflation gas into the air bag upon the occurrence of predetermined occupant conditions at the time the air bag cushion is deployed such that the inflatable profile of the air bag is increased in instances when said predetermined occupant conditions occur, wherein the actuatable inflation control device comprises a moveable member alignable with a vent opening within a housing containing the inflator, the moveable member being moveable relative to the vent opening upon activation of the actuation mechanism thereby at least partially blocking the vent opening in conjunction with release of the tether element from the retaining member to increase the amount of inflation gas discharged into the air bag as the inflatable volume of the air bag is increased.

7. The invention as recited in claim 6 wherein the actuation mechanism comprises a single initiator to both actuate the variable inflation device and to release the profile restraining tether element.

8. The invention as recited in claim 7, wherein the initiator is a pyrotechnic squib.

9. The invention as recited in claim 6, wherein the secondary anchoring location comprises a fixed point of connection on the air bag cushion.

10. The invention as recited in claim 6, wherein the fixed position retaining member comprises an elongate stud adapted to slidingly engage a female acceptance member disposed along the profile restraining tether element.

11. An air bag assembly for cushioning restraint of an occupant in a vehicle during an impact event, the air bag assembly comprising:

an inflator activatable to discharge inflation gas upon the occurrence of predetermined vehicle conditions;

an air bag cushion including an interior surface in fluid communication with the inflator such that upon discharge of inflation gas from the inflator the air bag cushion is inflated to a deployed state from a location of deployment in substantially opposing relation to the occupant;

at least one profile restraining tether element operatively connected to the air bag cushion such that the profile restraining tether element restrains the expansion of the air bag cushion upon introduction of the inflation gas to the air bag cushion, the profile restraining tether element further being releasably anchored at a first anchoring element comprising a fixed position retaining member so as to shorten the operative length of the profile restraining tether element such that the air bag cushion is inflatable to a first restrained depth when the profile restraining tether element is anchored to the fixed position retaining member, the profile restraining tether element further being fixedly anchored at a secondary anchoring location separate from the fixed position retaining member, the profile restraining tether element being separate from the fixed position retaining member, the profile restraining tether element being releasable from the fixed position retaining member upon the occurrence of predetermined occupant conditions at the time the air bag cushion is deployed such that the air bag cushion is inflatable to a second restrained depth which is greater than said fist restrained depth when said predetermined occupant conditions occur and such that the profile restraining tether element remains fixedly anchored at the secondary anchoring location; and an actuatable variable inflation device to control the amount of inflation gas discharged into the air bag cushion wherein the variable inflation device is actuated in conjunction with the release of the profile restraining tether element from the retaining member using a single initiator to both actuate the variable inflation device and to release the profile restraining tether element, wherein the profile restraining tether element extends in sliding relation through one or more travel guide elements at the interior surface of the air bag cushion.

12. The invention as recited in claim 11, wherein the travel guide elements comprise loop elements.

13. An air bag assembly for cushioning restraint of an occupant in a vehicle during an impact event, the air bag assembly comprising:

an inflator activatable to discharge inflation gas upon the occurrence of predetermined vehicle conditions;

an air bag cushion including an interior surface in fluid communication with the inflator such that upon discharge of inflation gas from the inflator the air bat cushion is inflated to a deployed state from a location of deployment in substantially opposing relation to the occupant;

at least one profile restraining tether element operatively connected to the air bag cushion such that the profile restraining tether element restrains the expansion of the air bag cushion upon introduction of the inflation gas to the air bag cushion, the profile restraining tether element further being releasably anchored at a first anchoring element comprising a fixed position retaining member so as to shorten the operative length of the profile restraining tether element such that the air bag cushion is inflatable to a first restrained depth when the profile restraining tether element is anchored to the fixed position retaining member, the profile restraining tether element further being fixedly anchored at a secondary anchoring location separate from the fixed position retaining member, the profile restraining tether element being separate from the fixed position retaining member, the profile restraining tether element being releasable from the fixed position retaining member upon the occurrence of predetermined occupant conditions at the time the air bag cushion is deployed such that the air bag cushion is inflatable to a second restrained depth which is greater than said first restrained depth when said predetermined occupant conditions occur and such that the profile restraining tether element remains fixedly anchored at the secondary anchoring location;

an actuatable inflation control device; and an actuation mechanism including an initiator activatable in response to a signal based upon input data from one or more sensors measuring conditions of the occupant such that the actuation mechanism releases the profile restraining tether element from the retaining member and conjunctively directs additional inflation gas into the air bag upon the occurrence of predetermined occupant conditions at the time the air bag cushion is deployed such that the inflatable profile of the air bag is increased in instances when said predetermined occupant conditions occur, wherein the actuatable inflation control device comprises a moveable member alignable with a vent opening with a housing containing the inflator, the moveable member being moveable relative to the vent opening upon activation of the actuation mechanism thereby at least partially blocking the vent opening in conjunction with release of the tether element from the retaining member to increase the amount of inflation gas discharged into the air bag as the inflatable volume of the air bag is increased, wherein the profile restraining tether element extends in sliding relation through one or more travel guide elements at the interior surface of the air bag cushion.

14. The invention as recited in claim 13, wherein the travel guide elements comprise loop elements.

* * * * *